April 17, 1973 E. J. BIDANSET 3,728,081

TAPE CARTRIDGE FOR USE IN AUTOMATED SAMPLE ANALYSIS APPARATUS

Filed July 8, 1971

INVENTOR.
EDWARD J. BIDANSET

BY Tedesco & Rockwell

ATTORNEYS

United States Patent Office 3,728,081

Patented Apr. 17, 1973

3,728,081

TAPE CARTRIDGE FOR USE IN AUTOMATED SAMPLE ANALYSIS APPARATUS

Edward J. Bidanset, Amawalk, N.Y., assignor to Technicon Instruments Corporation, Tarrytown, N.Y.

Filed July 8, 1971, Ser. No. 160,858
Int. Cl. G01n *31/00*
U.S. Cl. 23—259 7 Claims

ABSTRACT OF THE DISCLOSURE

A tape cartridge for use in automated sample analysis apparatus, including a casing having a tape supply portion and a tape take-up portion and permitting the exit from and return of the tape to the casing in a loop in its transport from the supply portion to the take-up portion. An elongated tape platen to longitudinally receive the loop of the tape may be hinged at one end of the platen to the casing to fold and lie along a portion of the casing in a stored position of the platen. The tape platen is swingable outwardly from the casing to an operative projecting position in which it coacts with external apparatus at opposite sides of the platen, the tape being adapted to receive a substance thereon utilized in sample analysis.

BACKGROUND OF THE INVENTION

(1) Field of invention

A tape cartridge for use in automated sample analysis for the supply and take-up of tape employed in such analysis to transport to a point of use a substance utilized in an assay.

(2) Prior art

In modern automated sample analysis, it is common to employ a web or tape as a support or carrier for a reagent to be mixed with a sample deposited on the tape, and also to add a reagent to a tape-supported sample, as shown and described, for example, in the co-pending U.S. patent application of Adler, Ser. No. 881,971, filed Dec. 4, 1969, now U.S. Pat. No. 3,650,698, issued Mar. 21, 1972, assigned to the assignee of the instant application. It is also common to employ a web or tape as a support or carrier for a reacted sample deposited thereon for examination concurrently with the deposit or at a later time after storage of the web, as shown and described in the co-pending U.S. patent application of Smythe, Ser. No. 419,128, filed Dec. 19, 1964, now U.S. Pat. No. 3,624,223, issued Nov. 30, 1971, assigned to the assignee of the instant application. The reacted sample on the tape may be examined with the naked eye or by the use of an instrument such as a photometer.

It has been proposed to employ in automated sample analysis a web or tape solely for the purpose of transferring a substance from the tape to another carrier such as another tape. Such a use is shown and described in Natelson U.S. Pat. No. 3,261,668 issued July 19, 1966.

The handling of such tape on which liquid deposits have previously been made has often resulted in inconvenience or messy conditions heretofore, as in the loading of the tape and in the storage or disposal of the products of analysis, for example.

SUMMARY OF THE INVENTION

It is an object of the invention to provide a convenient tape cartridge for sample analysis apparatus which facilitates storage of the tape before use, transporting the tape in condition for use, loading of the tape, transporting of the web or tape in use, and disposing of the tape after use as to waste or storage. The invention contemplates elimination of at least most of the need for the tape user to handle the tape directlly.

A further object is to provide a tape cartridge which is dust and moisture resistant, and which may serve as a container for waste products of analysis such as liquids in addition to the tape. A further object is to provide a tape cartridge which enables tape to pass between external devices of a type employed in sample analysis and which is associated with a platen which may be foldable. Yet another object of the invention is to provide a tape cartridge associated with a platen which may be heated by conduction to enable the temperature controlled reaction of a substance on the tape. The platen may have an optically reflective surface which, when cooperating with transparent tape, enables one of a number of types of photometric analysis of a sample on the tape. The cartridge also includes efficient tape guides and a tape tensioning device. There is also provided a tape cartridge, the body of which may be of a disposable character.

Still further, there is provided a tape cartridge for use in automated sample analysis apparatus, including a casing having a tape supply portion and a tape take-up portion and permitting the exit from and return of the tape to the casing in a loop in its transport from the supply portion to the take-up portion, and housing a tape guide and tape tensioning device. The cartridge may include an elongated tape platen to longitudinally receive the loop of the tape. The platen may be hinged at one end of the latter to the casing to fold and lie along a portion of the casing in a stored position of the platen when the cartridge is not in use. The tape platen is swingable outwardly from the casing to an operative projecting position in which it coacts with external apparatus disposed at either side of a run of the tape on the platen, the tape being adapted to receive a substance thereon which is useful in automated sample analysis.

DETAILED DESCRIPTION OF THE PREFERRED EMBODIMENTS

Figures 1, 2, 3:
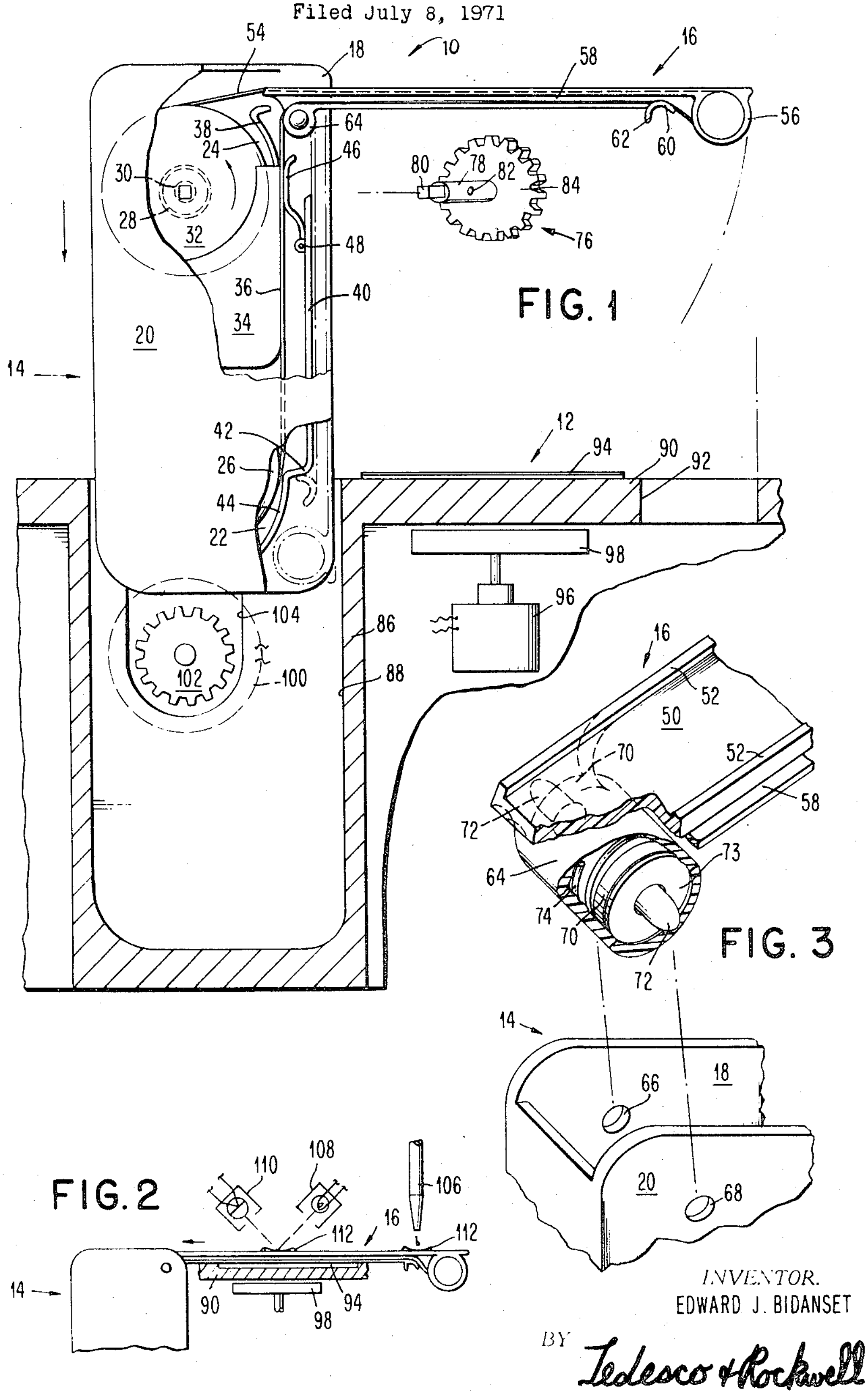
FIG. 1 is a fragmentary, elevational view, partly broken away, illustrating a tape cartridge embodying the invention, showing the cartridge in the process of being loaded into sample analysis apparatus, the last-mentioned apparatus being shown partly in section.
FIG. 2 is a somewhat diagrammatic representation of the tape cartridge illustrating the same in use.
FIG. 3 is a perspective view on a larger scale illustrating the disassociation of the tape cartridge platen from the casing of a cartridge, as in the assembly of the platen with a fresh cartridge.

In FIG. 1 of the drawing, the tape cartridge is indicated generally at 10 and the sample analysis apparatus generally at 12. The cartridge 10 comprises a casing or body, indicated generally at 14, and, in the illustrated form, a platen indicated generally at 16. The cartridge casing preferably comprises a body element 18 and a cover 20 which may be formed of a molded plastic material or structured of a suitable metal. Plastic is the preferred material, and permits the walled body 18 and the cover 20 to be sonically welded to one another on assembly.

The casing body element 18 is generally oblong and provides a tape supply portion 22 spaced longitudinally from a tape take-up portion 24. In the body portion 22, a spool 26 of tape is mounted on an integral boss, not shown, of the body permitting rotation of the spool 26. In the body portion 24, the body is provided with an integral sleeve part 28 the interior of which communicates with an opening 30 in the body, as shown in FIG. 1. The sleeve part 28 provides a fixed support on which the body of a take-up spool 32 is directly mounted for rotation.

As shown in FIG. 1, the take-up spool 32 is mounted in the upper portion of the casing body and the supply spool in the lower portion of the casing body. Intermediate these spools and extending under the takeup spool 32, the body may have, as an integral part thereof, a drip receptacle 34 open at the top and extending under the spool 32 to catch drippings from liquids previously deposited on the tape during operation of the tape cartridge. This drip receptacle effectively tends to maintain the tape supply in dry condition. If desired, the drip receptacle 34 may be extended downwardly, partially around and below the supply spool 26, in a manner not shown, to give the receptacle a greater volume.

The front wall of the receptacle 34 may provide a guide surface, as at 36, for the tape as it passes from the supply spool 26. The last-mentioned front wall is extended arcuately, as at 38, above the receptacle 34, as shown, to provide a spatter-proof barrier between the tape issuing from the supply and the take-up spool 32.

The body 18 also has a frontal flange 40 having a portion thereof spaced forwardly of the drip receptacle 34. The flange 40 extends downwardly from the last-named portion to provide a first inwardly directed portion 42 merging into a portion 44 which portion 44 partially encircles the supply spool 26. The flange 40 tends to protect the unused tape, and also provides a fixed support on the rear part thereof for a tape tensioning spring 46. The last-named spring is of leaf form and presses between its ends on the tape to hold the latter firmly against a portion of the tape guide 36. One end of the spring 46 may be supported from the flange 40, as at 48.

The platen 16 of elongated form is preferably of a type which may be heated by conduction, and may be structured conveniently of a suitable metal. The platen has an upper or outer longitudinal tape run provided by a planar surface 50 between upstanding side edges 52 of the platen, which platen construction is best shown in FIG. 3. The aforementioned side edges 52 provide tape guides. The planar surface 50 extends to what may be termed the inner end of the platen from which terminus of the surface 50 the tape, indicated at 54, passes to the take-up spool 32 as it leaves the platen, as shown in FIG. 1.

The other end of the surface 50 merges into a rounded tape-guiding surface provided by a hollow, semicylindrical part 56 of the platen extending transversely of the latter as shown in the last-mentioned view. The part 56 may be cast as an integral part of a platen, and the aforementioned rounded peripheral surface of this part, forming a tape guide, avoids a sharp bend in the tape as it passes upwardly over the outer end of the platen traveling toward the guide surface 50. The tape 54 may be transparent, and the platen surface may be reflective to coact with the tape in a manner to be described hereinafter. While the cartridge may be utilized with any one of various types of tape, the last-mentioned transparent type of tape may be structured of a material sold under the trademark Mylar.

The platen 16 provides a lower or inner longitudinal tape run. For this purpose, the platen has a deep longitudinal groove 58 formed therein opening through one side thereof, as shown in FIGS. 1 and 3, and bounded in part by an upwardly or outwardly facing longitudinal, planar platen surface, generally similar to the surface 50, and over which the tape 54 passes traveling toward the outer rounded end part 56 of the platen. The tape guiding groove 58 extends through the inner end of the platen as shown in FIG. 1.

The platen, adjacent the semicylindrical part 56, is cut away at the lower part thereof to provide an opening through which the tape 54 passes from the groove 58 toward the guide part 56, as shown in the last-mentioned view, and in this area the platen has a tape guiding part 60 inclined as shown in FIG. 1 tangentially toward the part 56. Also in this area the platen has a downwardly or inwardly directed finger part 62 which may be formed integrally therewith.

As shown in FIG. 1, the platen 16 in the full line position thereof has a transversely extending boss 64 in a plane below the groove 58 and located at the inner end of the platen, which boss 64 provides a rounded tape guiding surface for the tape passing into engagement with the platen from the casing 14 and, more specifically, the guide 36. The boss 64 is provided primarily to mount the platen on the casing which mounting may be a pivotal one.

For this purpose the boss 64 has an opening therethrough extending transversely of the platen to receive pin means coacting with means defining a hole 66 (FIG. 3) in the casing body 18 and means defining a registering hole 68 in the cover 20. Mounted in the last-mentioned opening in the boss 64 are a pair of oppositely directed moveable plunger members 70, for example, and each provided with a fixed pin-like projection 72 extensible through a respective retainer 73 in the boss, as shown in FIG. 3. The plunger members 70 are resiliently urged apart, to so extend the respective pin-like projections 72, by a compression spring 74 disposed between the members 70, as shown in the last-mentioned view. The pin-like projections 72 may be depressed by finger pressure of the user to mount and dismount the platen from the casing, that is, with reference to the pin-receiving holes 66, 68, as indicated in FIG. 3. The illustrated mounting of the platen 16 discussed above permits the platen to be swung or folded from its projecting, operative position shown in full lines in FIG. 1 to the inner, inoperative position shown in broken lines in the last-mentioned view. In the last-mentioned position, the underside of the platen abuts the flange 40 which forms a stop, and the platen finger 62 may engage and be frictionally held by the flange portion 42 to prevent inadvertent dislocation of the platen from its folded position. In this position, the platen 16 may be substantially flush with the casing, as indicated in FIG. 1.

It will be understood that there is contemplated a platen which may be disassociated from the casing for replacement of the casing portion of the cartridge or for other purposes, such as shipment and storage of the casing portion, for example. The casing portion may be of a disposable nature and may be disassociated from the platen and thrown away when the tape from the supply spool 26 has been fully advanced to the take-up spool 32 by a tape drive to be described hereinafter.

It will be understood that the tape of a fresh cartridge may be mounted on the platen by pulling out of the casing a loop of the tape extending between the two spools and to which spools the tape is attached, and sliding the platen into the loop so formed so that it has the lower and upper runs previously described. The platen may be folded, if desired, with the tape mounted on the platen in the illustrated form.

A drive element, indicated generally at 76, is provided to drive the take-up spool 32 to transport the tape in the cartridge. In the illustrated form, the drive element 76 has a fixed shaft portion 78 which is received in the shaft hole 30 of the casing body. At one end thereof the shaft portion 78 has a squared element 80 fixed thereto which is snugly received in a complementally formed opening in one end face of the spool 32, so that rotation of the shaft portion 78 effects a driving motion to the take-up spool 32. The shaft portion 78 may have a radially extending detent 82 therein to coact with the casing body in a manner to prevent axial dislocation of the drive element 76 once it is assembled with the cartridge.

This construction and arrangement, however, permits the drive element to be removed from the cartridge and inserted in another cartridge when this is desired, as upon cartridge replacement, so that the drive element 76, like the platen 16, may be retained for reuse. The drive element 76 may be pulled out of the take-up spool 32 as easily as it may be inserted therein by a thrust movement. In the form shown, the drive member 76 comprises a gear part 84 affixed to the other end of the shaft portion 78 and by which the shaft portion 78 may be driven.

The tape cartridge 10 is shown in FIG. 1 being inserted in typical sample analysis apparatus 12 which may take the form shown and described in U.S. patent application Ser. No. 881,971 filed Dec. 4, 1969, referred to above, which apparatus is useful among other things for determining the coagulation rate of human blood. The use of the apparatus utilizing the tape cartridge 10 is shown diagrammatically in FIG. 2.

The sample analysis apparatus 12 (FIG. 1) includes an upstanding frame part 86 constructed of a suitable material and having an upwardly opening well therein indicated at 88. The frame part 86 provides a counter-like element 90 flush with the opening of the well 88 and having an opening therein as at 92. The counter element 90 supports a horizontal heater plate 94 in proximity to the well 88 which plate may be heated by a resistance coil not shown. Spaced below the counter element 90 in proximity thereto is a suitably supported electric motor 96 having an upwardly arranged driving shaft to which is affixed a transversely extending bar magnet 98 for rotation by the motor shaft, the bar magnet being generally below the heater plate 94.

The frame part 86 also supports in a suitable manner an electric motor 100 driving a gear 102 on a horizontal axis which gear 102 is located in the lower part of a vertical channel 104 formed in the frame part 86 and communicating with the well 88 as shown in FIG. 1. The well 88 receives the casing 14 of the tape cartridge in the vertical position of the latter. The driving element 76 which includes the gear 84 is assembled with the cartridge as aforesaid prior to insertion of the casing in the well 88. Prior to insertion of the casing, the platen 16 is swung to the full line position of FIG. 1 with the tape of the cartridge supported on the platen 16 as aforesaid. In assembling the cartridge with the analysis apparatus, the user may support the platen in its extended position shown in FIG. 1 in one hand, while supporting the casing with the other hand. The cartridge casing is lowered into the well 88 and the platen rested on the heater plate 94.

The opening 92 in the counter element 90 provides clearance for the rounded outer end part 56 of the platen. A suitable stop, not shown, may extend into the well 88 to coact with the lower end of the casing 14 to limit its downward movement and to assure proper meshing of the gear 84, having a driving connection to the take-up spool 32, and the aforementioned gear 102. The aforementioned channel 104 provides clearance for the gear 84 as the cartridge is lowered into the well 88.

It is believed made clear from the foregoing that when the cartridge is assembled with the sample analysis apparatus and the motor 100 is energized, the gear 102 is driven effecting rotation of the take-up spool 32. As indicated in U.S. patent application 881,971 supra, the motor 100 may be energized intermittently to advance the tape on the platen 16.

With reference to FIG. 2, at the side of the platen 16 remote from the heater plate 94 and the rotary bar magnet 98 there may be disposed a plurality of drop dispensers, one being indicated at 106 by way of example, and a photometer coacting with the tape on the platen and including a light source 108 and a detector 110. The use of drop dispensers such as the dispenser 106 and a photometer such as a photometer 108, 110 is described and illustrated in the apparatus of U.S. patent application Ser. No. 881,971 supra, with reference to a tape.

The tape may have wells 112 formed thereon at longitudinally spaced intervals as by crimping of the tape, which wells are shown in FIG. 2. In the manufacture of the tape shown in FIG. 2 deposits of a substance may be made in the wells 112. Such deposits may take the form of liquids or suspensions which dry in the wells 112 and adhere thereto. Such substances on the tape may be dissolved during sample analysis by the addition thereto of one or more liquid substances, and a reaction may take place on the tape which may be examined as by the photometer 108, 110, which reaction is induced by heat applied to the platen 16 and the tape carried thereby, as by conduction from the heater plate 94 under the platen.

The particulate matter in suspension in the wells 112 during analysis may include magnetic material which is influenced by rotation of the bar magnet 98 by the motor 96 to effect mixing of the substance or substances in the wells 112 as shown and described in U.S. patent application Ser. No. 881,971 supra. It is brought out there that the liquid mixture on the tape may be opaque initially and after a period of time within which a reaction takes place the mixture may become substantially transparent which condition may be registered and a signal generated by the photometer which coacts with the aforementioned reflective outer surface of the platen 116, the tape being transparent.

Returning to FIG. 2, it is believed made clear from the foregoing that the drop dispenser 106 may dispense one or more drops of a sample or a reagent on the tape for reaction with a substance previously deposited on the tape either during analysis or during the manufacture of the tape. The drop dispenser and the photometer 108, 110 preferably have a common support hinged on a horizontal axis to swing away from the platen 16 to clear the same so that the tape cartridge may be removed from the sample analysis apparatus without difficulty. Such a support of the drop dispenser 106 and the photometer 108, 110 is not shown.

With reference to other uses of the tape cartridge, it has been previously indicated that it is common to employ a web or tape as a support or carrier for reacted samples deposited thereon for examination concurrently with the deposit or at a later time after storage, as shown and described in U.S. patent application Ser. No. 419,128, filed Dec. 19, 1964. The reacted sample on the tape may be examined with the naked eye or by the use of an instrument such as a photometer. Also with reference to other uses of the tape cartridge, it has been proposed to employ in automated sample analysis, as previously indicated, a web or tape solely for the purpose of transferring a substance from the tape to another carrier such as another tape, which use is shown and described in Natelson U.S. Pat. No. 3,261,668, issued July 19, 1966. As both the cartridge casing 14 and the platen 16 are supported from the analysis apparatus 12 in the illustrated form of the invention, it is believed obvious that these elements may be separately supported by the analysis apparatus if desired.

It is believed made clear that the tape cartridge achieves the stated objects. One important feature of the cartridge is the provision for the take-up of used tape and the provision of the drip receptacle 34 provided by the casing to collect drippings from the tape as the used portion of the tape is transported onto the take-up spool. This drip receptacle effectively tends to maintain the tape in the supply portion of the casing in dry condition. It will be evident that the tape in the supply portion of the casing may be folded therein rather than wound on a supply spool. It will also be evident that the tension spring 46 maintains tension on the tape as it is wound onto the take-up spool 32 by the action of the drive element 76 the rotation of which is controlled by the gear 102.

While the presently preferred embodiments of the tape cartridge have been shown and described, it will be apparent, especially to those versed in the art, that the tape cartridge may take other forms and is susceptible of various changes in details without departing from the principles of the invention.

What is claimed is:

1. A tape cartridge for use with automated sample analysis apparatus, which apparatus has elements thereof for the travel of a tape therebetween and for cooperation with a substance carried by such tape, and which apparatus includes a cartridge support and a tape driving motor, comprising: a supply of tape for carrying a substance to a point of utilization in the sample analysis apparatus, a tape take-up spool, a cartridge body having means defining a tape supply portion supporting said tape supply, said cartridge body having in proximity to said supply portion means defining a tape take-up portion supporting for rotation said take-up spool, means for driving said take-up spool from the motor, and said cartridge body having means for exit from and return of the tape to the body in a loop in its transport from said supply portion to said take-up portion, and an elongated platen receiving said tape loop longitudinally thereof, said platen having at one end portion thereof support means coacting with means on said body to enable the platen to project from said body.

2. A tape cartridge as defined in claim 1, wherein: said support means on the platen and the coacting means on the body permit the platen to be removed from said cartridge body.

3. A tape cartridge as defined in claim 1, wherein: said support means on the platen and the coacting means on the body hinges the platen to swing to a folded inoperative position.

4. A tape cartridge as defined in claim 1, wherein: said platen has an outer surface providing an outer tape run therealong, said platen having a longitudinal side opening therein receiving the tape and providing an inner tape run.

5. A tape cartridge as defied in claim 1, wherein: said cartridge body has therein a moisture barrier intermediate said tape supply portion and said tape take-up portion thereof.

6. A tape cartridge as defined in claim 1, wherein: said cartridge body is elongated and vertically arranged in the operative position thereof, said tape take-up portion of the body being disposed above said tape supply portion thereof, and said body has therein a drip receptacle intermediate said portions thereof and extending under said take-up spool.

7. A tape cartridge as defined in claim 6, wherein: said tape supply, said tape take-up spool and said drip receptacle are enclosed.

References Cited

UNITED STATES PATENTS

| | | | |
|---|---|---|---|
| 3,495,787 | 2/1970 | Wallace ------ | 179—100.2 ZX |
| 3,508,879 | 4/1970 | Findl et al. -------- | 23—253 R |
| 3,502,438 | 3/1970 | Natelson --------- | 23—253 R |

JOSEPH SCOVRONEK, Assistant Examiner

U.S. Cl. X.R.

23—253 R, 292; 179—100.2 Z